United States Patent [19]

Higuchi

[11] Patent Number: 4,766,358
[45] Date of Patent: Aug. 23, 1988

[54] LINEAR STEPPING MOTOR

[75] Inventor: Toshiro Higuchi, Yokohama, Japan

[73] Assignee: Nippon Seiko Kabushiki Kaisha, Tokyo, Japan; a part interest

[21] Appl. No.: 418

[22] Filed: Jan. 5, 1987

Related U.S. Application Data

[63] Continuation-in-part of Ser. No. 804,167, Dec. 3, 1985, Pat. No. 4,689,529.

[51] Int. Cl.⁴ .............................................. H02K 41/00
[52] U.S. Cl. .................................... 318/135; 104/281; 104/282; 104/284; 310/12
[58] Field of Search ..................................... 310/12–14; 318/135; 104/281, 282, 284

[56] References Cited

U.S. PATENT DOCUMENTS

| | | | |
|---|---|---|---|
| 3,771,033 | 11/1973 | Matsui | 104/282 |
| 3,829,746 | 8/1974 | Van | 318/135 |
| 4,055,123 | 10/1977 | Heidelberg | 104/284 |
| 4,689,529 | 8/1987 | Higuchi | 310/124 |

Primary Examiner—Mark O. Budd
Assistant Examiner—Judson H. Jones
Attorney, Agent, or Firm—Shapiro and Shapiro

[57] ABSTRACT

A linear stepping motor comprises a stationary member, a movable member, an attraction magnetic pole and a guiding magnetic pole. The movable member has four pole pieces each having a plurality of teeth facing those of the stationary member. The attraction magnetic pole maintains the movable member floated by a magnetic coil providing an attractive force. The guiding magnetic pole has four coils on the four pole pieces, and causes the movable member to move by consecutive and selective energization of the four coils.

3 Claims, 10 Drawing Sheets

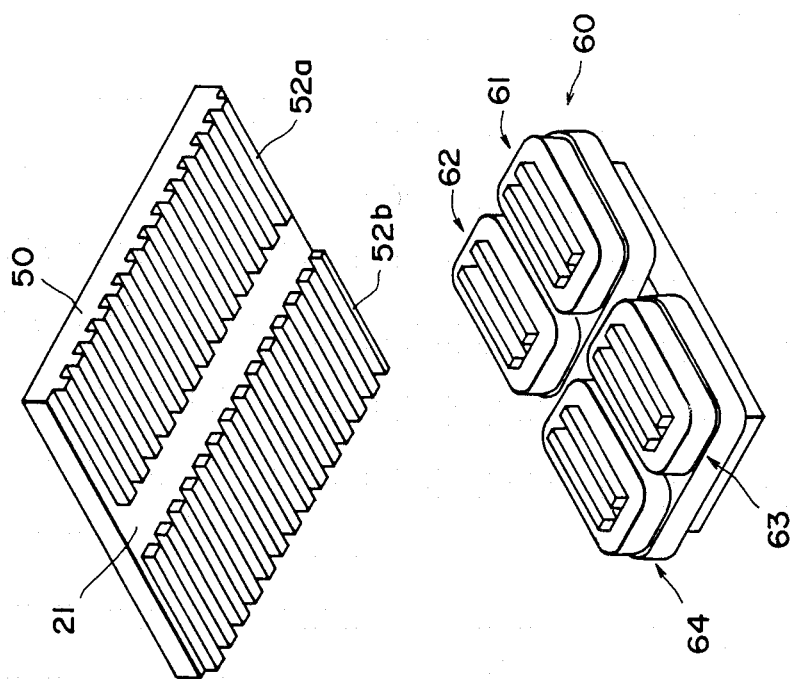
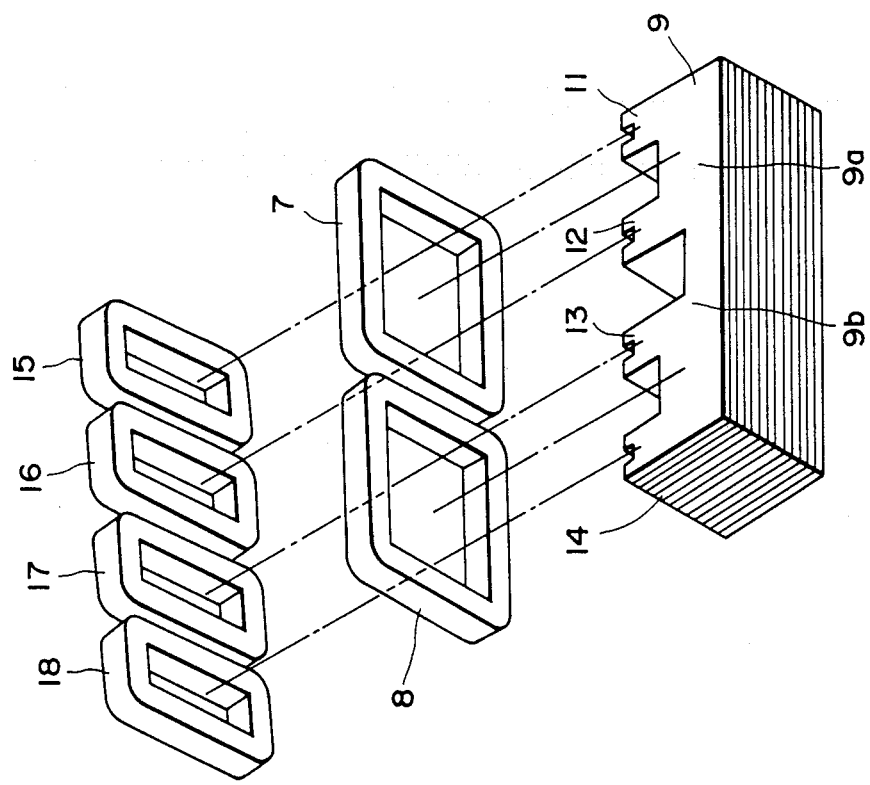
FIG. 7
FIG. 6

PERMIANCE PER PITCH OF THE TOOTHED POLE
(AS A FUNCTION OF X) a:b=45:55

LINEAR STEPPING MOTOR

CROSS-REFERENCE TO RELATED APPLICATION

This application is a continuation-in-part of Ser. No. 804,167 now U.S. Pat. No. 4,689,529, filed Dec. 3, 1985.

BACKGROUND OF THE INVENTION

1. Field of the Invention

The present invention relates to a linear stepping motor provided with a driving-guiding mechanism for maintaining a movable member in noncontact state by means of attractive force of electromagnets and also driving and guiding the movable member.

2. Description of the Prior Art

For achieving a linear movement, there has conventionally been employed a device in which a table, provided with a guide mechanism involving mechanical contact and a driving mechanism utilizing a ball screw on a motor shaft, is moved for example on a stationary surface plate. Such a device inevitably generates dust particles by the abrasion, since the frictional contact of component parts is unavoidable. The dust particle generation is a major problem in case such a device is used in a clean room as a positioner or a conveyor for a precision work such as manufacturing of integrated circuits.

Thus, in order to eliminate the mechanical contact, there has been proposed a fluid pressure guide, in which pressurized fluid such as oil or air is present between a stationary part and a movable part and maintains a small gap therebetween by the static pressure of said fluid. Such a guide is driven for example by a linear motor and is free from the drawback of dust particle generation.

However the above-explained fluid pressure guide is still associated with the following problems:

(1) As the distance between the stationary part and the movable part is generally as small as 5–10 μm, the mutually opposed surfaces thereof have to be entirely finished with a very high precision;

(2) In case of use in a clean room, dust and moisture have to be sufficiently removed from the fluid, since they may accumulate in the mechanism, thus hindering the function thereof, causing corrosion of various parts and contaminating the atmosphere in the clean room; and (3) The above-explained mechanism utilizing static fluid pressure cannot be employed in an apparatus to be used in vacuum, such as the apparatus for laser beam machining or electron beam machining.

SUMMARY OF THE INVENTION

In consideration of the foregoing, the object of the present invention is to provide a linear stepping motor provided with a non-contact driving-guiding mechanism, which is featured by a simple structure not requiring very high overall precision, is free from dust particle generation and can be used in a clean room or in vacuum.

The above-mentioned object can be achieved, according to the present invention, by a linear stepping motor comprising a stationary member; a movable member having a face opposed to said stationary member; first magnetic means for suspending said movable member in a floating state with respect to said stationary member by means of magnetic attractive force; second magnetic means for magnetically displacing said movable member with respect to said stationary member; and control means for controlling said first and second magnetic means to determine the position of said movable member with respect to said stationary member.

According to the present invention, the mutually opposed surfaces of the movable and stationary members need not be finished with a very high precision, since the movable member is magnetically suspended in space, driven and guided to achieve a highly precise movement while a relatively large gap is maintained between the movable and stationary members. Also the absence of mechanical contact and fluid eliminates the dust particle generation, thus allowing the use as a positioner or a conveyor in a clean room or also in vacuum. Also the use in a gravity-free state is possible if the magnetic attractive force is balanced by another force. Also the driving and guiding are achieved by mere attractive force on a magnetic material facing the magnetic generators, and such a simple structure enables to dispense with additional magnets or the like which are required in the magnetic floating apparatus utilizing magnetic repulsive force.

BRIEF DESCRIPTION OF THE DRAWINGS

FIG. 6 is an exploded perspective view of the magnetic devices shown in FIG. 1;

FIG. 7 is a perspective view showing a variation of the magnetic devices;

DETAILED DESCRIPTION OF THE PREFERRED EMBODIMENTS

Figure 1:
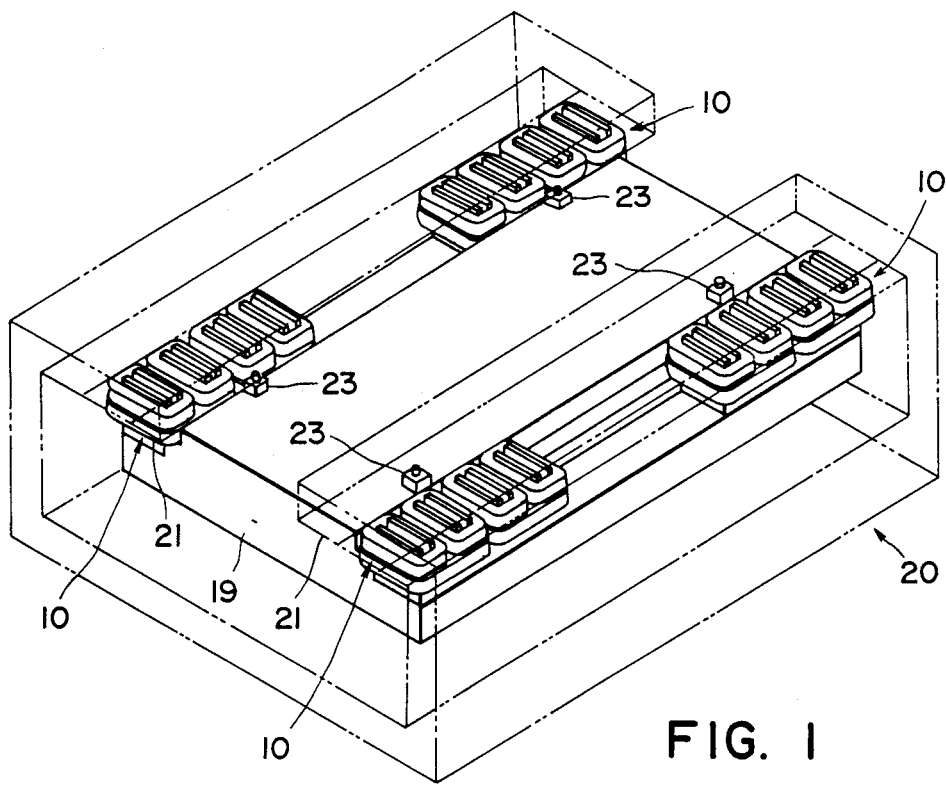
FIG. 1 is a perspective view of a linear stepping motor constituting a first embodiment of the present invention.

FIG. 1 shows a linear stepping motor constituting a first embodiment of the present invention, wherein a movable member 19 is suspended in space by attractive force of four magnetic devices 10 in a groove of a stationary member 20, and is moved along the longitudinal direction thereof.

Figure 2:
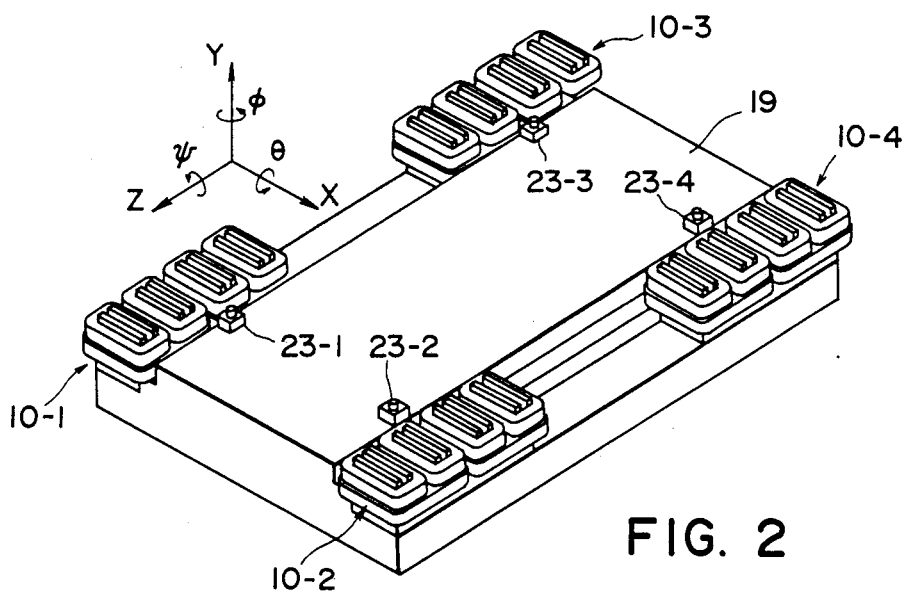
FIG. 2 is a perspective view of a movable member shown in FIG. 1.

The stationary member 20 is composed of a magnetic material and is extended with a square C-shaped (⊐)

cross section to accommodate the movable member 19 in the groove thereof. As shown in FIGS. 3 to 6, two upper portions of the stationary member 20, divided in the center thereof, are provided, on the lower faces thereof, with a plurality of transversal teeth 22 extended over a predetermined width and positioned at a predetermined pitch. Inside the rows of said teeth 22 there are provided flat surfaces serving as reference planes 21 for gap measurement with displacement sensor 23 which will be explained later As shown in FIG. 2, the movable member 19 is extended with a T-shaped (⊥) cross section matching the groove of the stationary member 20, and is provided, at the corners thereof, with four magnetic devices 10 facing the rows of said teeth 22 of the stationary member 20 and with four displacement sensors 23 positioned adjacent to said magnetic devices and facing said reference planes 21.

Figure 3:
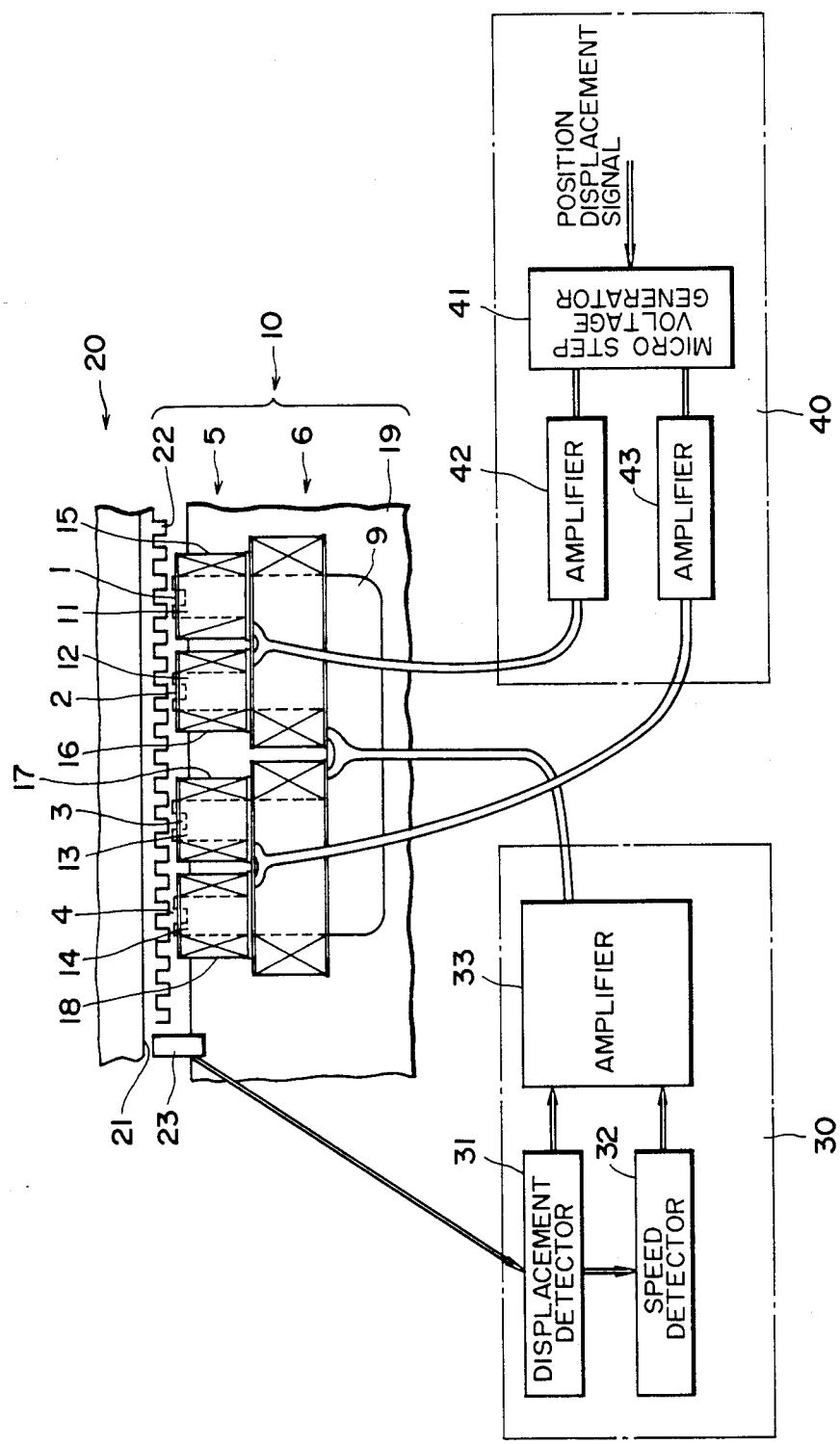
FIG. 3 is a block diagram showing the control method of the devices shown in FIG. 1.
Figure 4:
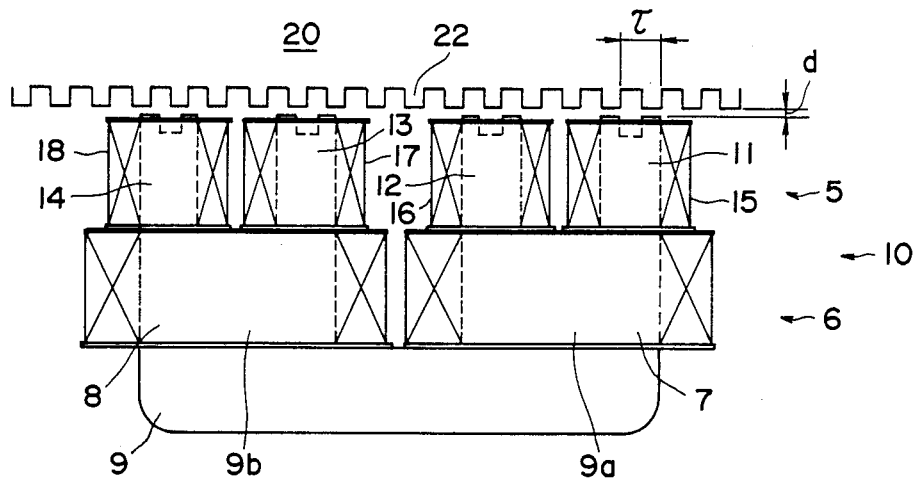
FIG. 4 is a detailed view of a part of the magnetic devices shown in FIG. 1.
Figure 5:
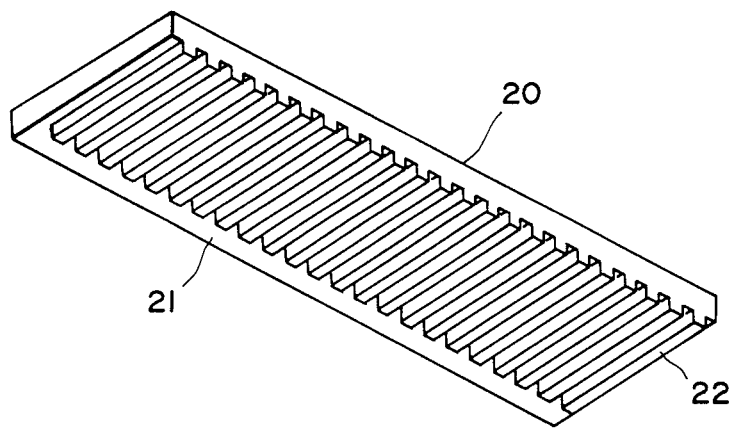
FIG. 5 is a perspective view of magnetic devices and teeth of a stationary member shown in FIG. 1.
Figure 5:
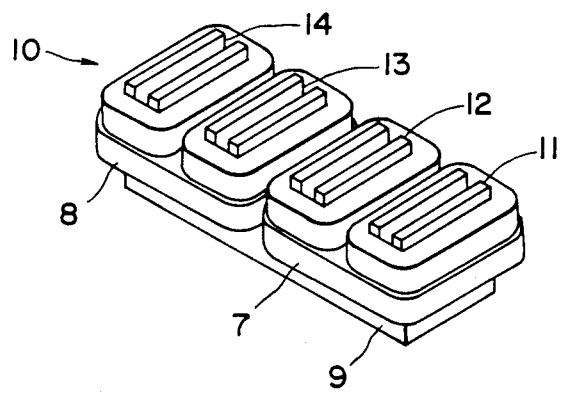

As shown in FIG. 3, each magnetic device 10 is composed of magnetic poles 5 for driving and guiding the movable member 19 and magnetic poles 6 for suspension by attractive force. Said magnetic poles 5, 6 are controlled respectively by control devices 40, 30 positioned in a stationary part outside the movable member 19. The displacement sensors 23 are fixed on the movable member 19, adjacent to the magnetic devices 10 and the detecting faces being directed toward the reference planes 21 of the stationary member 20. The signals obtained from the displacement sensors 23 are supplied to the control device 30.

As shown in FIG. 6, the magnetic device 10 is composed of a core member 9; main flux coils 7 wound on said core member and forming magnetic pole group 6; and driving coils 15, 16, 17, 18 forming magnetic pole group 5 composed of magnetic poles 1, 2, 3 and 4.

Figure 10:
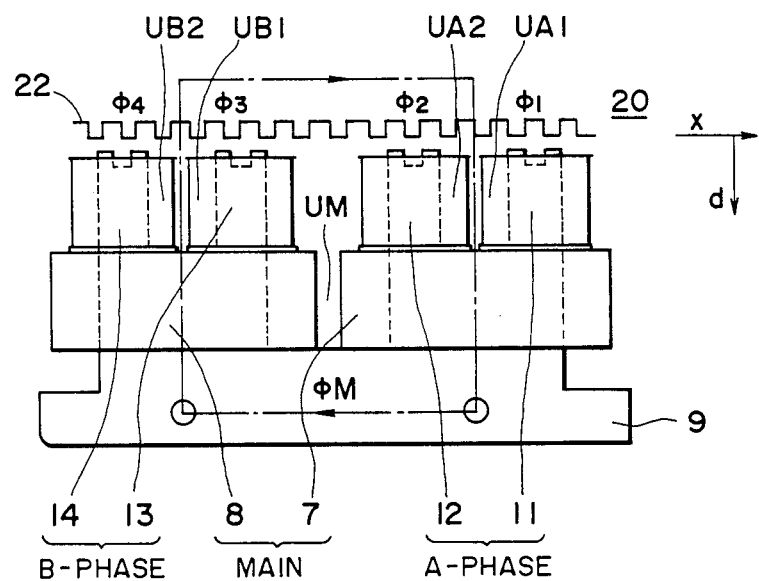
FIG. 10 is an illustrative view showing a magnetic arrangement on the movable member.

The core member 9 is composed of laminate structure of magnetic steel plates punched in a shape of two C-shapes are laterally connected. The core member 9 may also be composed of an integral magnetic material, but the above-mentioned laminate structure of steel plates allows easier and inexpensive manufacture, with a reduced eddy current loss. Around said two C-shapes 9a, 9b of the core member 9, there are serially wound main flux coils 7, 8 in such a manner as to exhibit mutually opposite polarity thus forming the magnetic pole group 6. When the main flux coils 7, 8 are energized, a magnetic flux as shown in FIG. 10 is generated to exert attractive force between the stationary member 20 and the movable member 19. A similar effect can be obtained by winding the main flux coils 7, 8 longitudinally on a portion connecting two C-shaped portions.

In details, the main flux coils 7, 8 form the magnetic flux passing through the core 9 of the movable member 19, between a first pole piece 11 and a second pole piece 12, teeth 22 of the stationary member 20, a body of the stationary member 20, between the third pole piece 13 and the fourth pole piece 14, and said core 9 of the movable member 19 as shown in FIG. 10. The main flux coils 7, 8 keep the movable member 19 floated by the magnetic flux.

The core member 9 is provided with projections constituting the first pole piece 11, the second pole piece 12, the third pole piece 13 and the fourth pole piece 14 on which respectively wound are driving coils 15, 16, 17 and 18 to constitute a first magnetic pole 1, a second magnetic pole 2, a third magnetic pole 3 and a fourth magnetic pole 4. In the present embodiment, the driving coils 15 and 16, or 17 and 18 are serially connected in such a manner that they exhibit mutually opposite polarities. However, they may also be so connected in parallel as to exhibit mutually opposite polarities.

Each of said pole pieces 11, 12, 13 and 14 is provided with two teeth respectively facing the teeth 22 of the stationary member 20, and the pitch $\tau$ of the teeth of each pole piece is as same as that of the teeth 22 of the stationary member 20. With respect to the position of the teeth on the first pole piece 11, measured at the center of teeth, the teeth on the second pole piece 12 are displaced by $l\tau + \frac{1}{4}\tau$, those on the third pole piece 13 by $m\tau \pm \frac{1}{4}\tau$, and those on the fourth pole piece 14 by $n\tau \pm \frac{1}{4}\tau$, wherein l, m and n are integers. In the present embodiment each pole piece is provided with two teeth, but the number of teeth may be arbitrarily selected. The gap d between said teeth and the teeth 22 of opposed stationary member is generally controlled in a renge from 0.3 to 0.5 mm.

The gap d is controlled in the following manner.

As shown in FIG. 3, the direction of attraction is controlled by the magnetic pole group 6, control device 30 and displacement sensors 23. The displacement sensor 23 measures the variation in the gap between the movable member 19 and the stationary member 20, and provides a displacement detector 31 with a corresponding variation signal. The displacement detector 31 transmits the signal from the displacement sensor 23 to a power amplifier 33, and the gap is controlled by a current obtained therefrom. Also the displacement detector 31 supplies the signal from the displacement sensor 23 to a speed detector 32, and the displacing speed obtained therein is supplied to the power amplifier 33 to achieve stable gap control. The power amplifier 33 is also provided with a resistor for detecting the variation in the coil current, thereby enabling further stabilized control.

There will be the control of attraction detailed below.

Figure 8:
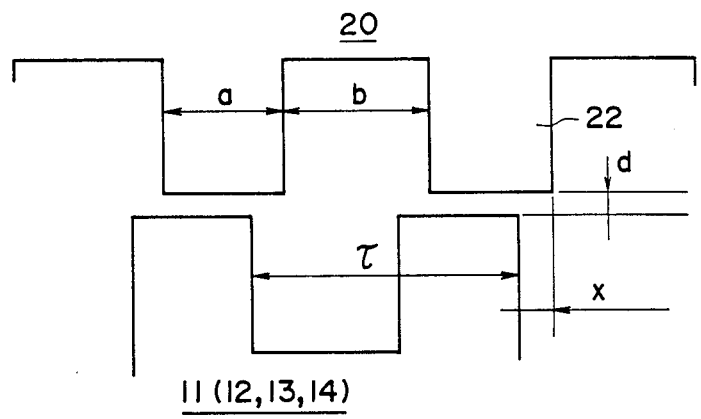
FIG. 8 is a partially enlarged view of teeth of the stationary and the movable members.
Figure 9:
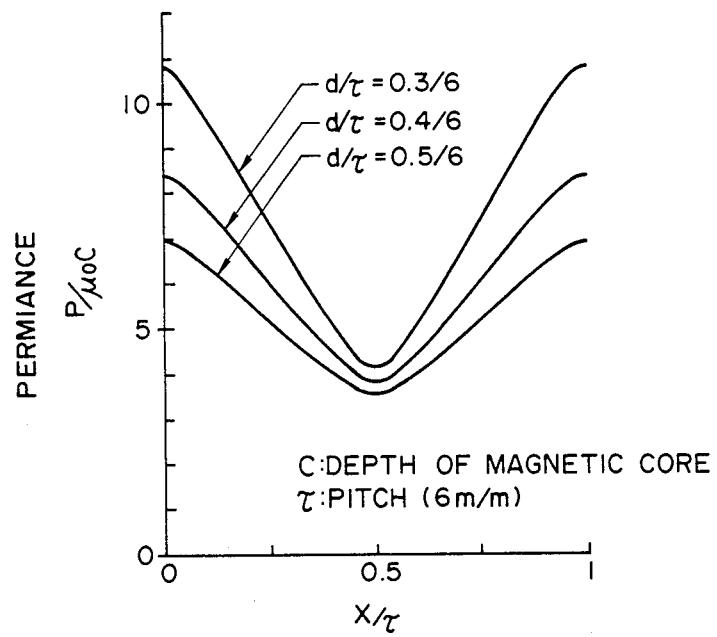
FIG. 9 is a graph showing a relation between permiance and a pitch of teeth.
Figure 11:
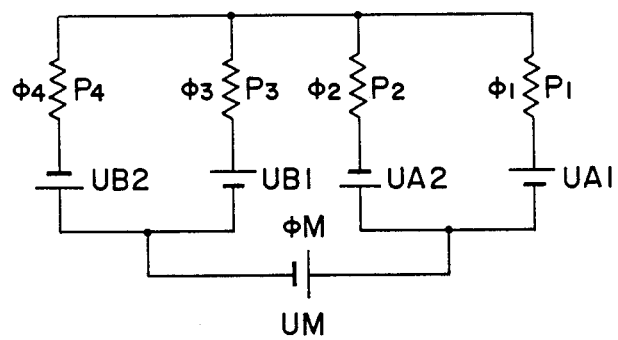
FIG. 11 shows a magnetic equivalent circuit of the magnetic arrangement as shown in FIG. 10.

In order to maintain a constant gap between a stator member and a movable member of a linear motor by magnetic attraction through the control of motor current while obtaining a propelling force in the linear motor, there is required a structure in which the relation of the control current and attractive force remains constant regardless of the position in the moving direction. FIG. 8 shows the tooth structure of a stepping motor, in which d indicates the gap, and x indicates the amount of displacement in the moving direction. When this tooth is present in a magnetic circuit, the attractive force f(x, d, i) is related with the permeance P(x, d) through an equation $f(x, d, i) \alpha \partial P(x, d)/\partial d$. The permeance $P(x, d)/\mu_0 c$ between the stator tooth and the movable pole, wherein c is the plate width, shows a significant variation by displacement x as shown in FIG. 9. Thus, the variation of total permeance is reduced by parallel addition, to the permeance P(x, d), of another permeance displaced by 180° ($\tau/2$). FIG. 10 shows the magnetic pole structure of the motor. Magnetic poles 1 and 2, or 3 and 4 are mutually displaced by 180° in phase, wherein a coil of A-phase is wound on the poles 1 and 2, and a coil of B-phase is wound on the poles 3 and 4. FIG. 11 shows a magnetic equivalent circuit in which magnetic resistances of cores are omitted. Magneto-motive forces UA1 and UA2, or UB1 and UB2 are mutually same but opposite in direction. UM is provided for providing a control current for maintaining the gap. The attractive force F is represented by $F = \partial(W1 + W2 + W3 + W4 + Wm)/\partial d$, wherein W1–W4 are energies associated with magnetic flux $\Phi_1 \sim \Phi_4$ passing through the magnetic poles 1–4, and Wm is energy associated with the magnetic flux $\Phi M$ passing through the main coils 7, 8.

Quantitative consideration will be given below to the gap control between said movable member and said stationary member (non-contact posture control).

As shown in FIG. 2, the axes of coordinates are positioned with Z in the moving direction, Y in the vertical direction and X in the transversal direction of the movable member 19 and the freedoms of motion rotatable with respect to X, Y and Z are denoted by $\theta$ (pitching), $\phi$ (yawing) and $\Psi$ (rolling). Here, the unit for them is radian.

In FIG. 3, supposed that the output signals supplied by the displacement detector 31 are denoted by $G_1$ to $G_4$ respectively corresponding to the displacement sensors (gap sensors) 23-1 to 23-4, these signals may be expressed by equations (1) using the displacements of Y, $\theta$ and $\Psi$.

$$G_1 = -Y + l\theta + m\psi \quad (1)$$
$$G_2 = -Y + l\theta - m\psi$$
$$G_3 = -Y - l\theta + m\psi$$
$$G_4 = -Y - l\theta - m\psi.$$

In the equations (1), when the gap between the movable member and the sensor increases, the output signals from the displacement circuit becomes positive, and a position of the displacement sensor from the center of gravity on the Z-X plane is defined by (l, m).

Y, $\theta$ and $\Psi$ can be obtained from these signals as described in the following equations (2).

$$Y = -\frac{1}{4}(G_1 + G_2 + G_3 + G_4) \quad (2)$$
$$\theta = \frac{1}{4l}(G_1 + G_2 - G_3 - G_4)$$
$$\psi = \frac{1}{4m}(G_1 - G_2 + G_3 - G_4).$$

Therefore, the control circuit of the present invention may obtain values for Y, $\theta$ and $\Psi$ from $G_1$ to $G_4$ according to the above equations so as to control the gap for each axis of coordinates.

Figure 12A:
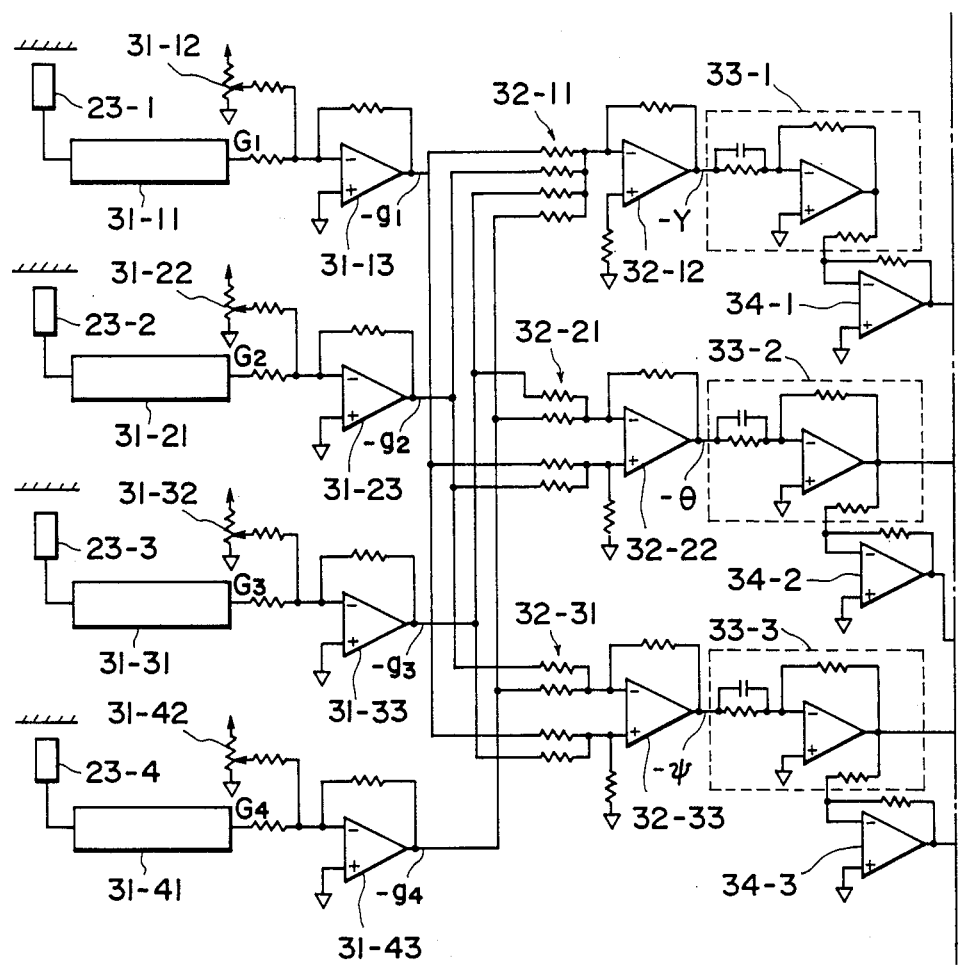
FIG. 12 is composed of FIGS. 12A and 12B, and shows an exemplary circuitry for gap control.
Figure 12B:
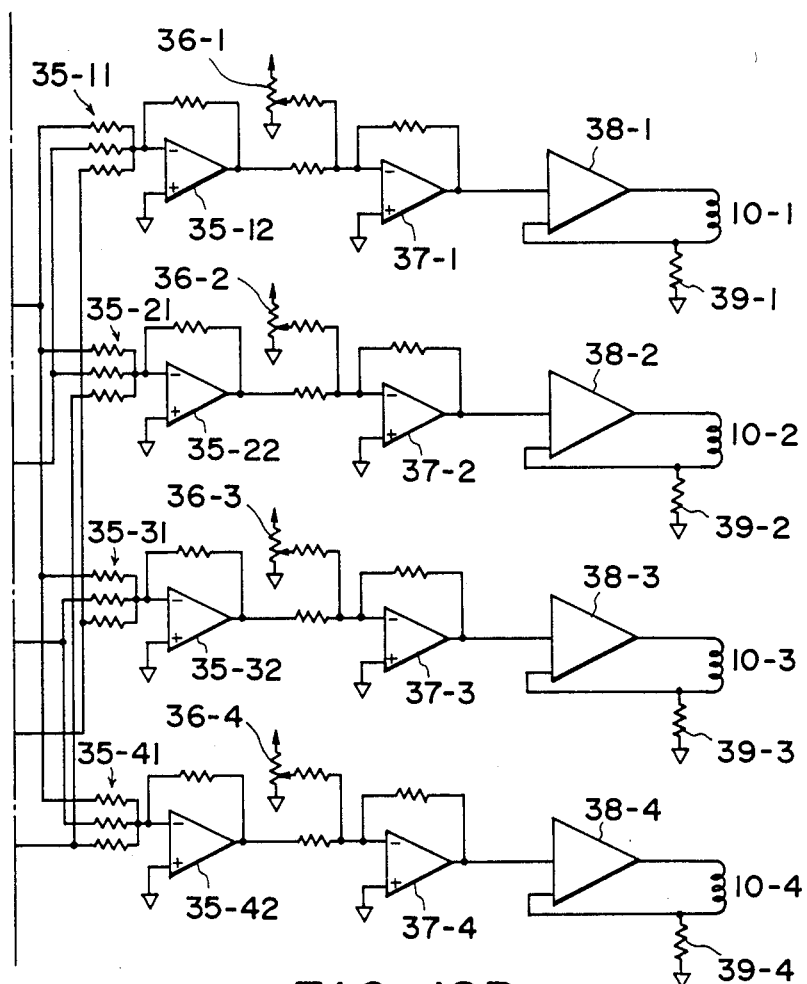
Figure 12:
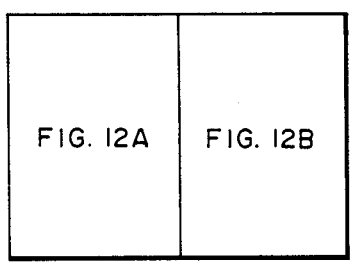

FIG. 12 shows an example of the control circuit. In FIG. 12, numerals 31-11, 31-21, 31-31 and 31-41 are sensor detectors of the displacement detecting circuit, which are provided corresponding to each displacement sensor to supply required electric signals detected by said sensors to displacement error amplifiers 31-13, 31-23, 31-33 and 31-43. In this case, the supplied signals are $G_1$ to $G_4$ with respect to the respective sensors. Numerals 31-12, 31-22, 31-32 and 31-42 are standard displacement setters. If setting values are $-G_{01}$ to $-G_{04}$ for the respective setters, output signals $-g_1$ to $-g_4$ from the displacement error amplifiers are expressed respectively as follows:

$$-g_1 = -(G_1 - G_{01})$$
$$-g_2 = -(G_2 - G_{02})$$
$$-g_3 = -(G_3 - G_{03})$$
$$-g_4 = -(G_4 - G_{04})$$

The output signals from the displacement error amplifiers are, for the transformation in accordance with the above-mentioned equations (2), supplied to axial displacement transforming matrixes 32-11, 32-21 and 32-31, and then amplified by amplifiers 32-12, 2-22 and 32-32 after the transformation. The signals in this case are expressed by the following formulas in which the transformed signals in the aforementioned equations (2) can be obtained.

$$-Y = -\frac{1}{4}(g_1 + g_2 + g_3 + g_4)$$
$$-\theta = \frac{1}{4l}(g_1 + g_2 - g_3 - g_4)$$
$$-\psi = -\frac{1}{4m}(g_1 - g_2 + g_3 - g_4).$$

The transformed signals Y, $\theta$ and $\Psi$ are transmitted to compensation circuits 33-1, 33-2 and 33-3 determined according to control characteristics respectively.

Here, proportional differential control (PD control) is employed in this embodiment. However proportional integral differential control (P ID control), digital compensation or the like is also applicable to the present invention.

Next, the compensated control signals of the respective axis are supplied through the amplifiers 34-1 to 34-3 to distribution transformation matrix circuits 35-11 to 35-42 which effect reverse transformation of the signals with respect to the previous axis transformation.

Setting values set by bias current setters 36-1 to 36-4 are added to output signals from the distribution matrix circuits 35-11 to 35-42 by means of addition amplifiers 37-1 to 37-4. After the addition, the signals are transmitted to current amplifiers 38-1 to 38-4.

Output signals from the current amplifiers are supplied to the main magnetic flux coils 10-1 to 10-4. Also, parts of the output signals are returned by current detection resistors 39-1 to 39-4 provided on respective return paths. Since electric currents pass through the main magnetic flux coils only in a single direction, these current amplifiers are unipolar amplifiers.

The magnetic device 10 according to the present invention comprises a magnetic pole group for maintaining attraction of the main magnetic flux coils and a driving guiding magnetic flux group of the driving coils of two phases A and B. The entire magnetic energy W of the magnetic device is represented by the following:

$$W = Wm + W_1 + W_2 + W_3 + W_4$$

wherein Wm is magnetic energy of the main magnetic flux coil and $W_1$ to $W_4$ are magnetic energy of the respective driving coils.

An attractive force F of the magnetic device 10 for suspending the movable member in a floating state is represented by the following equation (3).

$$F(Im, Ia, Ib, d, x) = \frac{\partial W}{\gamma d} \quad (3)$$

wherein
Im: an electric current of the main magnetic flux coil;
Ia: an electric current of the driving coils of A-phase;
Ib: an electric current of the driving coils of B-phase,
d: the gap between the movable member and the stationary member; and
x: displacement of the movable member in the moving direction.

The calculated values almost coincided with the actually measured values.

In the present invention, since the position control of the movable member in movin direction and the non-contact posture control may be considered as being independent from each other as mentioned above, the parameters Ia, Ib, x in the equation (3) may be ignored. Also, when a variation of the current of the main magnetic flux coil is represented by $\Delta i$ and a variation of the gap by $\Delta d$, the following equation (4)

$$F = Fo + Ki\Delta i + Kd\Delta d \tag{4}$$

wherein Fo denotes a setting attractive force, which is a function of the set ga Do and the bias current Io of the main magnetic flux coil; Ki and Kd denote proportional constants for the current variation $\Delta i$ and the gap variation $\Delta d$, respectively.

Figure 13:
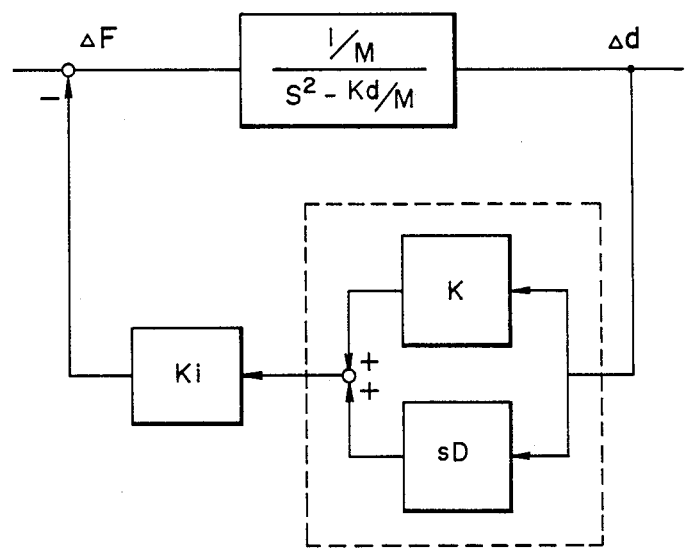
FIG. 13 shows an example of control system using the circuitry as shown in FIG. 12.

An example of the control system including the above-explained gap control circuit is shown in FIG. 13. In FIG. 13, transmittal characteristics of an object to be controlled is exemplified as $$\frac{1/M}{S^2 - Kd/M},$$

wherein M is a mass of the object.

In FIG. 13, K denotes a gain of a proportional term and D deos gain of a differential term. The control circuit as shown in FIG. 12 performs a PD operation and corresponds to a feed-back system which is enclosed by a dashed line in FIG. 13.

In other words, $\Delta d$ which is detected by the displacement sensor is proportionally and differentially controlled in Y, $\theta$ and $\Psi$, and its output is supplied to the main magnetic flux coil to vary the main magnetic flux, thereby controlling the attractive force $\Delta F = Ki \cdot \Delta i$ proportional to the current variation $\Delta i$.

Since the proportional term K supplies control signals in proportion to the gap while the differential term SD supplies the control signals in proportion to a change of the gap, i.e., a speed, the displacement detector 31 and the speed detector 32 in FIG. 3 respectively correspond to the above-mentioned proportional term and the differential term.

On the other hand, driving and guiding is controlled by the control device 40.

The motor driving is achieved by a micro step driving, in which current is so controlled that the ratio of the current $I_A$ in the coils 15, 16 to the current $I_B$ in the coils 17, 18 is smoothly changed to reach a determined value at a target stop position. In response to a position instruction supplied for example from an unrepresented computer, a microstep voltage generator 41 supplies an amplifier 42 with a current $I_A$ varying according to a sine curve, and another amplifier 43 with a current $I_B$ varying according to a cosine curve. The amplifiers 42, 43 supply amplified currents respectively to the coils 15, 16 and 17, 18.

FIG. 3 shows a state in which the magnetic pole 1 receives the strongest force. The movable member 19 is moved to the right if the above-mentioned state is generated in the sequence of magnetic poles 3, 2 and 4, or is moved to the left if said state is generated in the sequence of magnetic poles 4, 2 and 3.

Although the attractive force changes by a change in the current in each magnetic pole, $|I_A|$ increases when $|I_B|$ decreases because of a difference in phase between the currents $I_A$ and $I_B$. Consequently the change in the attractive forces of the magnetic poles 1, 2, 3 and 4 is much smaller than the attractive force generated by the main flux coils 7 and 8.

In summary, the guiding and driving is conducted by consecutively and selectively energizing the coils 15, 16, 17, 18 wound on the magnetic poles 1, 2, 3, 4 in a determined order. Then, the movable member moves in such a micro step mode that the teeth of the pole piece on which the energized magnetic coil is wound align with the teeth of the stationary member.

In contrast to the linear arrangement of the magnetic poles 1, 2, 3 and 4 in the foregoing embodiment, the magnetic poles 1, 2 may be positioned parallel to the poles 3, 4 as shown in FIG. 7. In a magnetic device 60, first and second serial magnetic poles 61, 62 are positioned parallel to third and fourth magnetic poles 63, 64 which are likewise serially connected. In this case the teeth of the pole piece 61 or 62 are aligned with those of the parallel pole piece 63 or 64, so that these teeth are displaced in phase by $\tau/4$ to the rows 52a, 52b of teeth of the opposed stationary member 50.

In the linear stepping motor of the first embodiment, equipped with four magnetic devices 10 and four displacement sensors 23 of the above-explained structure and function, the position control in the moving direction can be actively achieved by the driving-guiding magnetic poles in each magnetic device, while the position in the vertical direction, position around the moving direction and position around a transversal axis can be actively controlled by the attracting poles in each magnetic device. Also the remaining two freedoms of motion (position in the moving direction and position around a vertical axis) can be passively controlled by selecting the same width of the teeth 22 of the stationary member 20 as that of the teeth of each magnetic device 10 on the movable member 19. Consequently the movable member 19 can smoothly move along the longitudinal direction of the stationary member 20.

In case that the above-described linear stepping motor is used under the influence of gravity, the weight of the movable member 19 is balanced with the attractive force of the main flux coils 7, 8 of the magnetic devices 10. On the other hand, in case that it is used in a gravity-free state, or in case of increasing the rigidity, there may be provided additional solenoids, permanent magnets or magnetic devices for balancing with the attractive force of the above-mentioned magnetic devices 10. Also if an enough suspending force cannot be obtained by the magnetic devices 10 alone, supplementary attractive force can be provided by additional solenoids or permanent magnets in the same direction.

Figure 14:
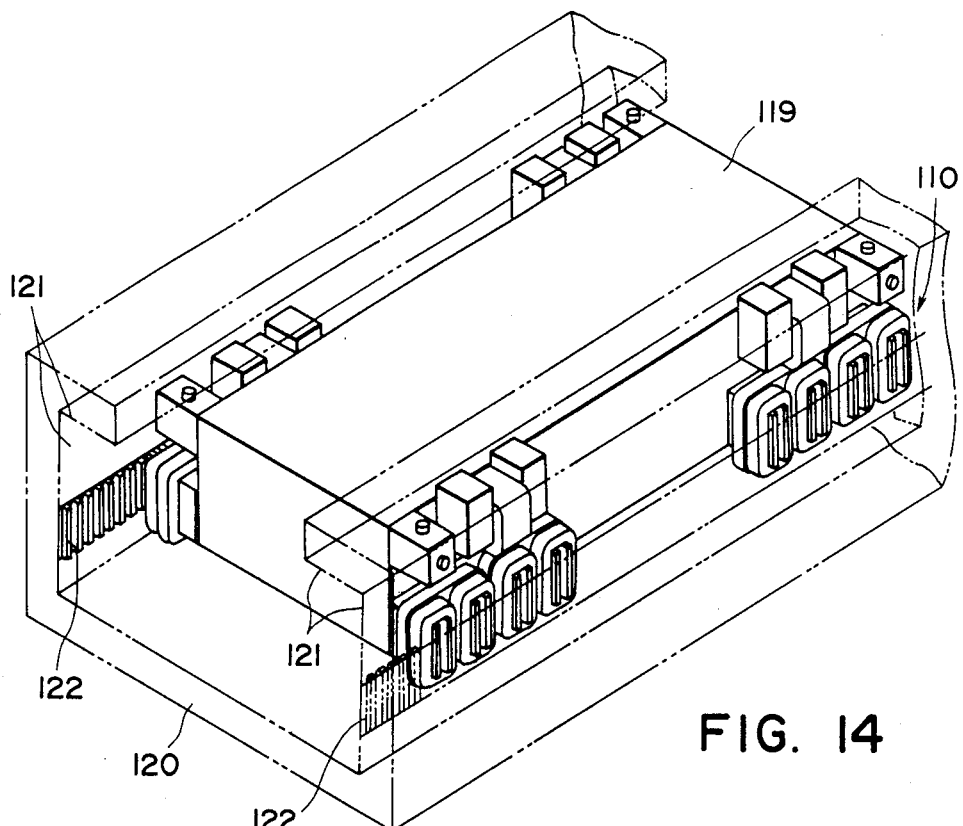
FIG. 14 is a perspective view of a linear stepping motor constituting a second embodiment of the present invention.
Figure 15:
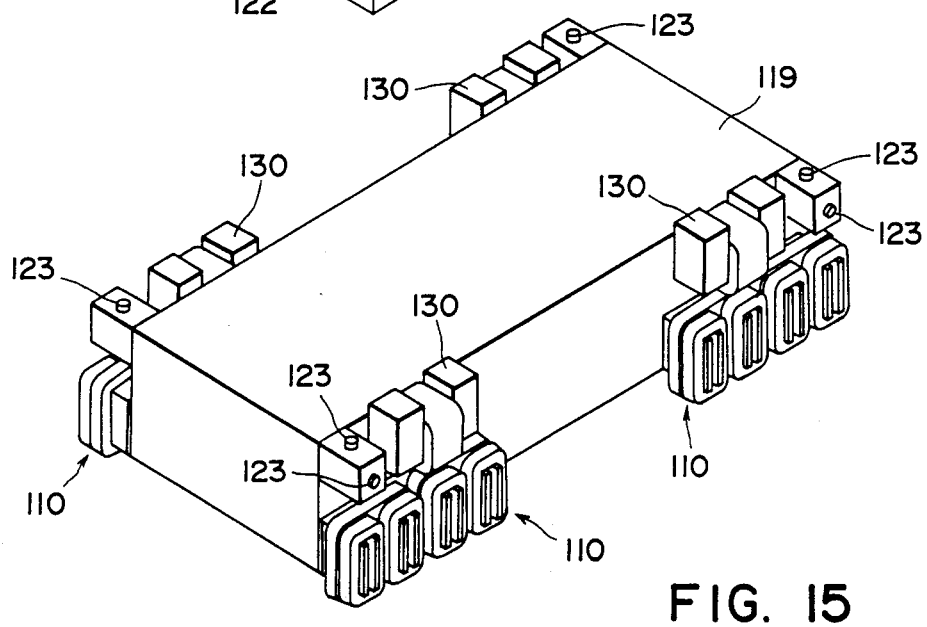
FIG. 15 is a perspective view of a movable member shown in FIG. 14.

FIGS. 14 and 15 illustrate a second embodiment of the present invention.

A stationary member 120 of a square C-shaped cross section, composed also of a magnetic material, is provided with rows of teeth 122 of a pitch $\tau$ on the internal faces of the lateral walls, and reference faces 121 are provided on the upper part of said internal faces and on the bottom face of the upper wall.

A movable member 119 has a rectangular shape, and is provided with four magnetic devices 110 positioned on the corners of lateral faces, four electromagnets 130 positioned respective above said magnetic devices, and eight displacement sensors 123, positioned by two at each corner. The detecting face of each displacement sensor 123 is directed toward the reference face 121 of the stationary member 120. Consequently the variation in gap is measured by four displacement sensors on the upper face, and by two displacement sensors on each lateral face.

The magnetic device 110 is almost the same as the magnetic device 10 in the first embodiment, and is driven on a similar principle. The electromagnet 130 is composed of a coil wound on a C-shaped core member and generates vertical attractive force to actively control the position of the movable member 119 in the vertical direction, position around the moving direction, and position around a transversal axis. The remaining three freedoms of movement, i.e. position in the moving direction, position in the transversal direction and position around a vertical axis can also be actively controlled by four magnetic devices 4. In this manner the linear stepping motor of the present embodiment can actively control all six freedoms of movement.

In contrast to the foregoing embodiments in which the magnetic devices and the rows of teeth are respectively provided on the movable member and the stationary member, it is also possible to achieve similar control by arranging the rows of teeth and the magnetic devices respectively on the movable member and the stationary member.

Although the foregoing embodiments employ four magnetic devices and four displacement sensors, there are needed at least three sets of magnetic devices and displacement sensors for moving the movable member. On the other hand it is also possible to increase the rigidity or improve the precision of control by employing more than four sets of magnetic devices and displacement sensors.

The wave form of the current generated by the microstep voltage generator need not be continuous but can show stepwise changes.

In the foregoing embodiments, the attractive force is solely controlled by the main flux coils, but it is also possible to supply the displacement signal of the displacement sensor to the control device of the driving-guiding coil to regulate the attractive force thereof, thus achieving gap adjustment through the attractive force of the main flux coils and of the driving-guiding coils.

What we claim is:

1. A linear stepping motor comprising:

an elongated stationary member having a plurality of teeth arranged at a pitch $\tau$ transversely of a longitudinal direction of said stationary member;

a movable member having first, second, third and fourth pole pieces arranged in the order named in said longitudinal direction of said stationary member, each of said pole pieces having a plurality of teeth opposed to said teeth of the stationary member and arranged at the pitch $\tau$, wherein said teeth of the second pole piece are located apart by $l\tau + \frac{1}{4}\tau$, those of the third pole piece are located apart by $m\tau \pm \frac{1}{4}\tau$, and those of the fourth pole piece are located apart by $n\tau \pm \frac{1}{4}\tau$ from the respective teeth of the first pole piece, in which l, m and n are integers;

attraction magnetic pole means for maintaining said movable member floated by a magnetic coil providing an attractive force of a magnetic flux passing through a body of the movable member, between the first and the second pole pieces, a tooth portion of the stationary member, a body of the stationary member, between the third and the fourth pole pieces, and said body of the movable member;

guiding magnetic pole means comprising first, second, third and fourth magnetic coils wound on the first, the second, the third and the fourth pole pieces, respectively;

guiding control means for controlling said guiding magnetic pole means to consecutively selectively energize said first to fourth magnetic coils in a predetermined order such that the teeth of the pole piece on which the energized magnetic coil is wound align with the teeth of the stationary member, and thereby to cause the movable member to move in the longitudinal direction of the stationary member; and gap control means for maintaining a gap between said stationary member and said movable member constant during the movement of the movable member.

2. A linear stepping motor according to claim 1, wherein said movable member is composed of laminated steel plates.

3. A linear stepping motor according to claim 1, wherein each of said pole pieces of the movable member has two teeth.

* * * * *